United States Patent Office 3,357,752
Patented Dec. 12, 1967

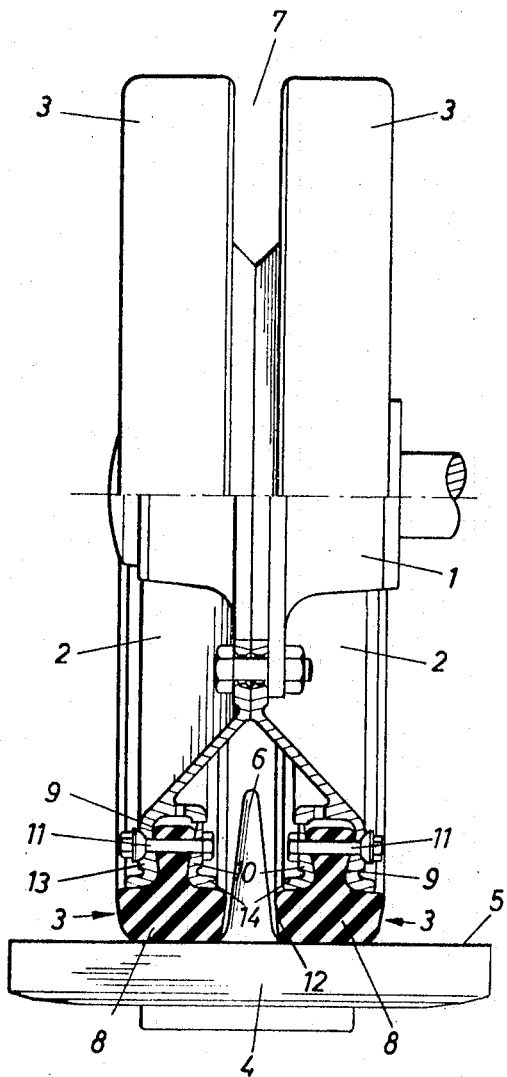

3,357,752
TRACK WHEEL FOR TRACK-LAYING VEHICLES
Walter Ruf, Landhaus am See, Thurgau,
Bottighofen, Switzerland
Filed Apr. 28, 1966, Ser. No. 546,096
Claims priority, application Germany, Apr. 28, 1965,
R 40,486
8 Claims. (Cl. 305—56)

ABSTRACT OF THE DISCLOSURE

A track-laying vehicle wherein the track wheel comprises a pair of easily replaceable parallel tires between which extend the teeth of the track member, the tires including respective side walls which bear against the teeth side walls from the point at which the teeth merge into the track member and for a substantial distance along the teeth side walls.

---

The present invention relates to an improvement in track wheels for track-laying vehicles in which a continuous track or chain member is driven by rotary wheels.

In known track-laying vehicles the rotary driving wheels include a circumferential cushion or tire portion which contacts the inner surface of the continuous track member. The track member inner surface includes a plurality of longitudinally aligned, inwardly protruding teeth and the track or chain member is driven by the wheel cushion portion engaging the chain inner surface and the side of the teeth, which thereby are guided against lateral displacement. This provides a better support against transverse forces which would tend to slip the chain off the wheels, such as the forces produced when the vehicle travels on slopes or around curves. Furthermore, since the chain teeth contact only the soft tire surface, the chain life is lengthened; however, the disadvantage remains that the chain life and the wheel life vary considerably relative to each other since the entire track wheel must be replaced after the wearing of only its tire portion.

Although it is generally known to provide individually replaceable parts, and specifically replaceable track wheel tires, in such known track wheels the chain teeth are inadequately guided and supported against the aforementioned lateral forces.

It is, therefore, an object of this invention to provide an improved track wheel which provides effective lateral guidance of the chain teeth while also being adapted to function for as long a period of time as the track member.

Specifically, it is an object of the invention to provide a track wheel with which, while assuring good guidance of the chain, the life of chain and track wheel are improved and adapted to each other. As a whole, the total wear of chain and track wheel upon their engagement are to be taken up by a single structural part.

This and other objects of the invention are realized by providing a track wheel which includes two laterally spaced circumferential tires replaceably mounted on a hub portion, the lateral space between the tires being adapted to receive the inwardly projecting track teeth.

The invention will better be understood with reference to the accompanying drawing whose single figure represents an end elevational view, the lower half portion thereof being in cross-section, of a track wheel and track according to one embodiment of this invention.

The improved wheel comprises a hub 1 to which are attached a pair of dish-shaped discs 2, each of which accommodates a tire 3 about its circumference. The tires 3 are preferably of solid plastic material, such as solid polyamide and they are held on the respective circumference of discs 2 by means of bolts or tie rods 11.

The track or chain member 4 consists of a plurality of links flexibly joined together so as to form a continuous chain. The inner surface 5 of the links is substantially flat and is suited to contact the facing surface of the tires 3. A tooth or pin 6 projects inwardly from each link and is adapted to be received between the laterally spaced tires 3.

The tires 3 are circular in plan view and substantially T-shaped in cross-section with the cross leg 8 thereof having a substantial depth or thickness whose inner vertical side wall 12 conforms to the inclination of the side walls of tooth 6 so that walls 12 laterally support said tooth beginning at the root thereof.

The stem portion 9 of the tires widens in a direction away from the cross leg 8, or towards hub 1, said stem being fixedly secured within a yoke formed by fixed wall 13 of ring 2 on one side and by movable clamping ring 10 on the other side of the tire. Wall 13 and ring 10 each include a laterally extending shoulder 14 which rests upon the inner side of cross-leg 8.

Bolts 11 serve to securely clamp the tire portions 9 between ring 10 and wall 13 while the tires 3, when worn, can be removed from rings 2 simply through loosening of bolts 11 and without any elaborate overhaul of the track-laying vehicle.

The track wheel of this invention provides the following advantageous features:

(a) The wear between parts is concentrated upon an easily replaceable part, the tires 3 which can easily be replaced, even in the field;

(b) By virtue of the tires 3 being replaceable, the life of the wheel itself is adapted to at least conform to the life of the track 4;

(c) The arrangement of the two tires 3 in spaced apart lateral relationship provides an extremely simple and yet effective lateral supporting or guiding means for the teeth 6 on the track 4.

The herein described embodiment is for illustrative purposes only and is not intended to be limitative of the scope of the present invention which is intended to also apply to various modifications, additions, etc., which are within the purview of one skilled in the art.

What is claimed is:

1. A track-laying vehicle comprising a track member passing over a rotatably mounted track wheel, said track member including a transverse bearing surface and a plurality of teeth inwardly projecting from said surface, said track wheel comprising a rotatably mounted hub, a pair of discs mounted on said hub, a pair of elastic tires, and means for easily replaceably attaching these elastic tires to said discs, said tires being laterally spaced apart from each other and having substantially straight facing side walls which conform to a portion of the side walls of said teeth, said teeth being receivable between the facing side walls of said tires whereby said teeth are laterally supported by said facing walls, said tires being substantially T-shaped in cross section and including a cross-leg and a perpendicularly extending stem portion, the outer face of said cross-leg bearing against said track member transverse bearing surface, said cross-leg having a substantial thickness, said facing side walls of said tires being constituted by the facing sides of said cross-legs, the facing sides of said cross-legs conforming to and contacting the side walls of said teeth from the point where said teeth side walls merge into said transverse bearing surface and for a substantial distance along the side walls of said teeth.

2. The vehicle of claim 1, said attaching means comprising a fixed wall of said discs and an opposed movable clamping ring, said stem portion fitting between said fixed wall and said ring, and means for drawing said ring towards said fixed wall.

3. The vehicle of claim 1, wherein said stem portion extends perpendicularly to the rotative axis of said hub, said stem portion widening in the direction towards said axis.

4. The vehicle of claim 1, said teeth being tapered in the direction of the rotative axis of said wheel.

5. A track wheel cooperating with a track member including a transverse bearing surface and a plurality of teeth inwardly projecting from said surface, said track wheel comprising a rotatably mounted hub, a pair of discs mounted on said hub, a pair of elastic tires, and means for easily replaceably attaching these elastic tires to said discs, said tires being laterally spaced apart from each other and having substantially straight facing side walls which conform to a portion of the side walls of said teeth, said teeth being receivable between the facing side walls of said tires whereby said teeth are laterally supported by said facing walls, said tires being substantially T-shaped in cross section and including a cross-leg and a perpendicularly extending stem portion, the outer face of said cross-leg bearing against said track member transverse bearing surface, said cross-leg having a substantial thickness, said facing side walls of said tires being constituted by the facing sides of said cross-legs, the facing sides of said cross-legs conforming to and contacting the side walls of said teeth from the point where said teeth side walls merge into said transverse bearing surface and for a substantial distance along the side walls of said teeth.

6. The track wheel of claim 5, said attaching means comprising a fixed wall of said discs and an opposed movable clamping ring, said stem portion fitting between said fixed wall and said ring, and means for drawing said ring towards said fixed wall.

7. The track wheel of claim 5, wherein said stem portion extends perpendicularly to the rotative axis of said hub, said stem portion widening in the direction towards said axis.

8. The track wheel of claim 5, said teeth being tapered in the direction of the rotative axis of said wheel.

References Cited

UNITED STATES PATENTS

| | | | |
|---|---|---|---|
| 1,804,470 | 5/1931 | Knox | 305—56 X |
| 2,984,524 | 5/1961 | Franzen | 305—56 |

FOREIGN PATENTS

| | | |
|---|---|---|
| 589,554 | 12/1959 | Canada. |
| 737,756 | 7/1943 | Germany. |

RICHARD J. JOHNSON, *Primary Examiner.*